United States Patent
Torkildsen et al.

(10) Patent No.: US 6,280,505 B1
(45) Date of Patent: Aug. 28, 2001

(54) SEPARATION OF ACID GASES FROM GAS MIXTURES

(75) Inventors: Bernt H. Torkildsen, Bergen-Sandviken; Martin Sigmundstad, Hafrsfjord; Harald Linga, Nesttun; Finn P. Nilsen, Nattland; Per H. Hanssen, Hafrsfjord, all of (NO)

(73) Assignee: Den Norske Stats Oljeselskap A.S. (NO)

( * ) Notice: Subject to any disclaimer, the term of this patent is extended or adjusted under 35 U.S.C. 154(b) by 0 days.

(21) Appl. No.: 09/526,226

(22) Filed: Mar. 15, 2000

Related U.S. Application Data (63) Continuation of application No. PCT/GB98/02775, filed on Sep. 14, 1998.

(30) Foreign Application Priority Data

Sep. 15, 1997 (GB) .................................................. 9719668
Feb. 24, 1998 (GB) .................................................. 9803864
Feb. 24, 1998 (GB) .................................................. 9803866

(51) Int. Cl.[7] ............................. B01D 47/10; B01D 53/14
(52) U.S. Cl. ................................. 95/216; 95/235; 95/236; 96/323; 261/DIG. 54
(58) Field of Search ............................. 95/216, 235, 236; 96/234, 266, 271, 272, 323; 261/DIG. 54

(56) References Cited

U.S. PATENT DOCUMENTS

| | | | |
|---|---|---|---|
| 3,912,469 | * 10/1975 | Ewan et al. | 261/DIG. 54 |
| 3,970,740 | * 7/1976 | Reeder et al. | 261/DIG. 54 |
| 4,235,607 | 11/1980 | Kinder et al. . | |
| 4,239,510 | 12/1980 | Hays et al. . | |
| 4,279,628 | 7/1981 | Wymer et al. . | |
| 4,293,524 | * 10/1981 | Teller et al. | 261/DIG. 54 |
| 4,511,544 | * 4/1985 | Connell et al. | 261/DIG. 54 |
| 4,603,035 | * 7/1986 | Connell et al. | 261/DIG. 54 |
| 4,828,768 | * 5/1989 | Talmor | 261/DIG. 54 |

FOREIGN PATENT DOCUMENTS 0379319   9/1996   (EP) .

* cited by examiner

Primary Examiner—Duane S. Smith
(74) Attorney, Agent, or Firm—Patterson, Thuente, Skaar & Christensen, P.

(57) ABSTRACT

A method for removing acid gas components from combustion gas and natural gas. The method includes bringing the gas mixture into contact with sea water and subjecting the gas mixture and sea water to turbulent mixing conditions. This causes the acid gas to be absorbed by the sea water. The sea water can be disposed of offshore without any detrimental effect on the environment.

12 Claims, 6 Drawing Sheets

SEPARATION OF ACID GASES FROM GAS MIXTURES

CROSS-REFERENCE TO RELATED APPLICATION

This is a Continuation of Application No. PCT/GB98/02775 filed Sep. 14, 1998.

FIELD OF THE INVENTION

The present invention relates to fluid separation systems. It is particularly concerned with the selective removal of a component or components from a mixture of gases using liquid solvent and is more particularly concerned with the absorption of acid gases such as $CO_2$, $NO_x$, $H_2S$, oxides of sulphur etc. from natural gas and from combustion gases.

BACKGROUND OF THE INVENTION

Conventional systems for the absorption of acid gases employ a liquid solvent; typical solvents include amines such as methyldiethanolamine (MDEA), monoethanolamine (MEA) or diethanolamine (DEA), and mixtures of solvents. These solvents absorb $CO_2$, $NO_x$, $H_2S$ and other acid gases. The solvent is contacted with the sour gas mixture (gas mixture including acid gases) in a column which may be a packed column, a plate column or a bubble-cap column, or a column with some other form of contact medium. In these systems, the gas and liquid streams flow countercurrently.

The prior art absorption systems suffer the disadvantage that in order to achieve a significant degree of gas/liquid contact, the columns have to be large and their operation is hampered by excessive foaming. In addition, the subsequent stripping section which removes the acid gas from solution must also be large, to handle the large volume of solvent used. Since the operation normally takes place under high pressure and the fluids involved are highly corrosive, the capital costs of the large columns and subsequent stripping section is high. Furthermore, operating costs and maintenance costs are high.

It is an object of the present invention to provide a system for removing acid gas from a sour gas mixture which does not suffer from the disadvantages of the prior art.

SUMMARY OF THE INVENTION

According to one aspect of the invention, there is provided a method of removing acid gas components from a gas mixture which comprises: bringing the gas mixture into contact with sea water; subjecting the gas mixture and sea water to turbulent mixing conditions thereby causing the acid gas to be absorbed by the sea water; and separating a gas phase and a liquid phase.

There may also be no need to treat the liquid phase to remove the absorbed acid gas components, since sea water is plentiful and does not need to be recovered for re-use.

This would mean that no downstream regeneration section is necessary. The presence of carbon dioxide in sea water does not represent an environmental hazard in the same way as atmospheric carbon dioxide and since the concentrations are relatively low, the carbon dioxide remains below the saturation capacity of sea water. The carbon dioxide-containing sea water can therefore be conveniently disposed of offshore where it will quickly be dispersed and will therefore have no detrimental effect on the environment.

If the sea water does absorb harmful acid gas components, they can be neutralised with suitably selected reagents. Again then, the gas-containing sea water can be disposed of offshore.

The method is particularly applicable to the removal of acid gases, especially carbon dioxide from combustion gas and from natural gas.

The turbulent mixing is very intense and results in extremely efficient gas liquid contact. The mixing regime is preferably turbulent shear layer mixing. The liquid entrained in the gas may be in the form of droplets for gas continuous fluid phase distribution. The efficient mixing means that absorption can take place very rapidly. The mixing system used is simple and inexpensive compared to prior art systems, and requires no solvent regeneration.

Preferably, the method is carried out as a continuous process with the gas mixture and sea water flowing co-currently. The co-current flow eliminates the problems associated with foaming, since separation can easily be effected downstream of the contactor.

The turbulent mixing may be achieved by any convenient means, such as an ejector or a jet pump or more preferably in a turbulent contactor including a gas inlet, a liquid inlet, an outlet leading to a venturi passage and a tube extending from the outlet back upstream, the tube being perforated and/or being spaced from the periphery of the outlet.

One suitable contactor is a mixer supplied by Framo Engineering A/S and is described in EP-B-379319.

Preferably, the tube is located in a vessel, the vessel including the gas inlet, the liquid inlet and the outlet. In one possible regime, the gas mixture is supplied to the tube, optionally directly, and the sea water is supplied to the vessel, and so the gas stream draws the sea water into the venturi and the two phases are mixed. In another regime, the gas mixture is supplied to the vessel and the sea water is supplied to the tube, optionally directly whereby the gas mixture is drawn into the venturi by the sea water and the two phases are mixed. In a third regime, the sea water and the gas mixture are supplied to the vessel, the sea water being supplied to a level above the level of the outlet, whereby the gas mixture is forced out through the outlet via the tube, thereby drawing the sea water into the venturi so that the two phases are mixed. In a fourth regime, the gas and liquid are supplied via separate pipelines into a common mixing point which can be made up as an ordinary pipe junction or as a venturi device as explained in regimes 1 to 3, or as a pipe junction followed by a static mixer device. In the contact pipeline, one or several secondary mixer stages can be installed to maintain the gas/liquid mixing efficiency. In all cases, the sea water absorbs the carbon dioxide and other acid gases.

Preferably, the gas mixture and the sea water are formed into a homogeneous mixture in the contactor, and the homogeneous mixture may be cooled prior to separation into a gas phase and a liquid phase. Preferably, the cooled homogeneous mixture is separated into a gas phase and a liquid phase in a hydrocyclone or any suitable gas-liquid separator.

In an alternative arrangement, a portion of the sea water, after extraction of $CO_2$, is recycled to the contractor. This serves to increase the $CO_2$ loading of the sea water. It should be noted that optimisation of the process may not necessarily relate to the removal efficiency in terms of mole fraction of $CO_2$ removed, but rather the energy consumption required per unit mass of $CO_2$ removed. By increasing the $CO_2$ loading of the sea water solvent, it is possible to reduce the amount of sea water that needs to be pumped out to sea.

According to a more specific aspect of the invention, there is provided a method for removing carbon dioxide from a combustion gas or natural gas which comprises: supplying the gas to a turbulent contactor; supplying sea water to the contactor; subjecting the gas and the sea water to turbulent mixing in the contactor to form a homogeneous mixture; allowing carbon dioxide from the gas to be absorbed by the sea water; cooling the homogeneous mixture; separating the cooled homogeneous mixture into a gas phase and a liquid phase in a hydrocyclone (or any other gas/liquid separator); removing the gas phase; and disposing of the liquid phase offshore.

Again, a portion of the sea water, after extraction of $CO_2$ may be recycled directly to the contactor.

In instances involving combustion gas which might be at a low pressure, the sea water is pumped to the contactor and thereby draws the combustion gas with it through the contactor. The system may include a pump arranged to supply sea water to the liquid inlet of the contactor. In instances involving natural gas which might be at a high pressure, the gas is conveyed to the contactor at a high pressure and thereby draws the sea water with it through the contactor.

The invention may be considered to extend to the use of sea water as an absorbent for acid gas components from natural gas and combustion gas. This is preferably effected by forming a homogeneous mixture of the gas mixture with the sea water in a turbulent contactor, allowing the acid gas to be absorbed by the sea water, and subsequently separating a gas phase and a liquid phase, the liquid phase thereby comprising sea water containing the acid gas. This sea water can then be returned to the environment without danger.

The realisation that a material as plentiful and inexpensive as sea water can be used as an absorbent for acid gas, coupled with the fact that it can be returned to the environment safely is particularly valuable as awareness is increased of the potential damage to the environment that can be caused by acid gases in gaseous effluents. Such effluents include combustion gas from fossil fuel power stations, from gas turbines in general and from diesel engines, particularly marine diesels.

Furthermore, the small size of the preferred apparatus compared to conventional absorption columns render the invention especially applicable to use in marine applications, such as in connection with natural gas on board shuttle tankers.

The invention may be put into practice in various ways and some specific embodiments will be described by way of example to illustrate the invention with reference to the accompanying drawings, in which:

DETAILED DESCRIPTION OF THE INVENTION

Figure 1:
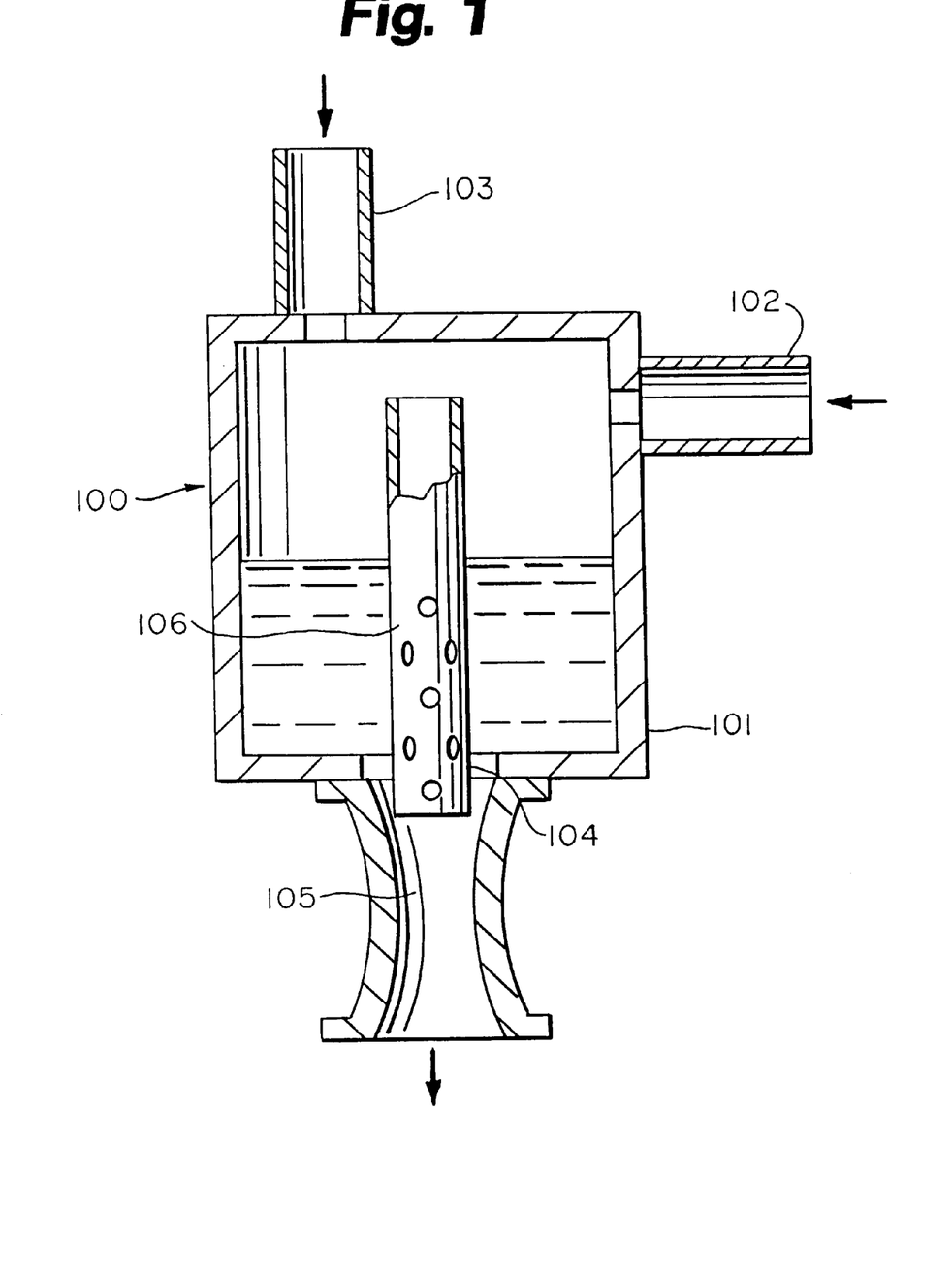
FIG. 1 is a view of a suitable turbulent contactor.

A turbulent contactor suitable for use in connection with the present invention is shown in FIG. 1. The turbulent contactor 100 comprises a vessel 101 having a gas inlet 102, a liquid inlet 103 and an outlet 104 leading to a venturi passage 105. There is a tube 106 (which may or may not be perforated) extending from the outlet 104 back into the vessel 101.

In a first arrangement, the gas mixture is supplied to the vessel 101 and the sea water is supplied to the tube 106 whereby the gas is drawn into the venturi by the sea water and the two phases are mixed.

In a second arrangement, the sea water is supplied to the vessel 101 and the gas mixture is supplied to the tube 106, whereby the sea water is drawn into the venturi by the gas and the two phases are mixed.

In a third arrangement, the sea water and the gas mixture are supplied to the vessel 101, the sea water being supplied to a level above the level of the outlet 104, whereby the gas is forced out through the outlet 104 via the tube 106, thereby drawing the sea water into the venturi so that the two phases are mixed.

Figure 2:
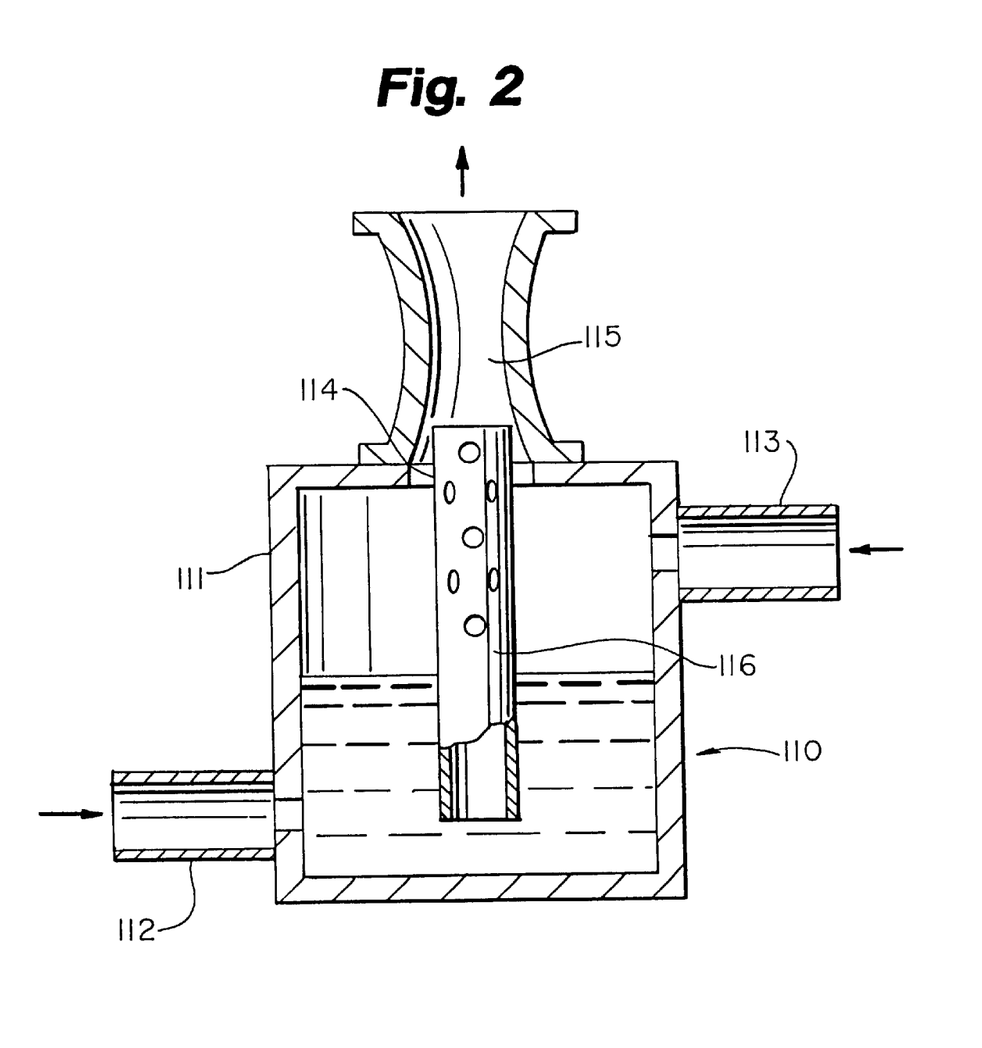
FIG. 2 shows an alternative contactor design.

A fourth variant is shown in FIG. 2. This embodiment is similar to that shown in FIG. 1, but the contactor 110 is inverted. It comprises a vessel 111 with a liquid inlet 112, a gas inlet 113 and an outlet 114 leading to a venturi passage 115. There is a tube 116 (which may or may not be perforated) extending from the outlet 114 back into the vessel 111. The tube 116 may be connected directly to the gas inlet 113.

Figure 3:
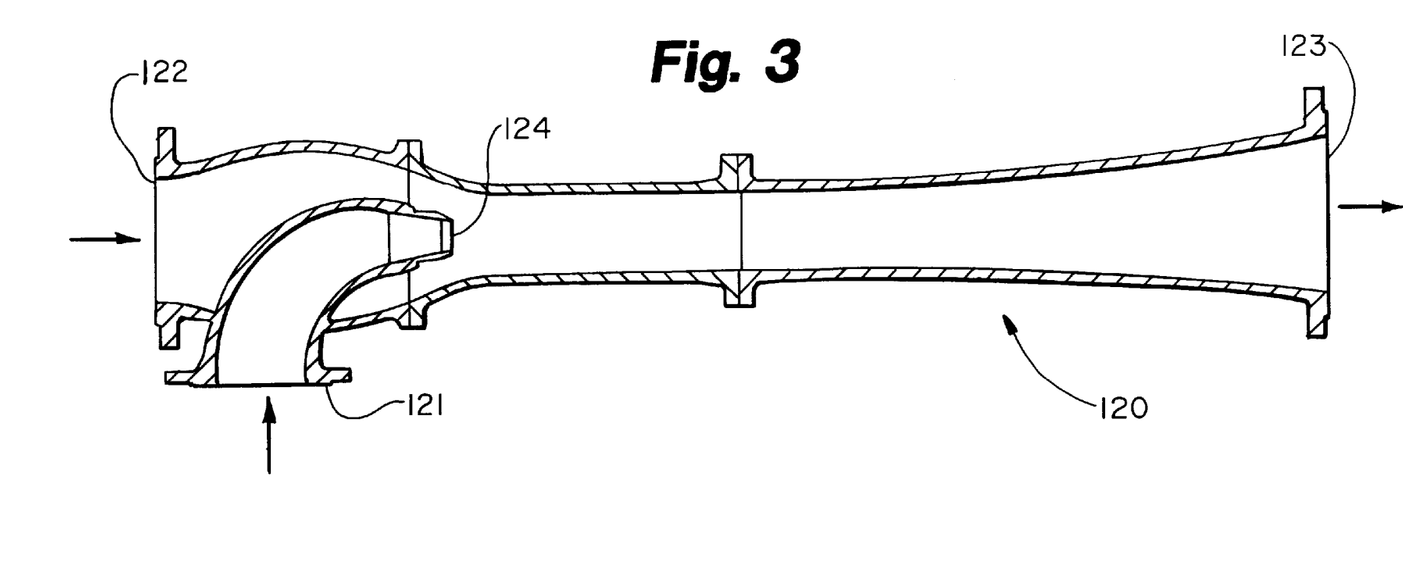
FIG. 3 shows a jet pump for use as an alternative to the contactors of FIGS. 1 and 2.

The contactors referred to in the above embodiments may be replaced by jet pump arrangements which are capable of inducing turbulent mixing. FIG. 3 shows a jet pump 120 comprising a first fluid inlet 121 for the high pressure fluid and a second fluid inlet 122 for the low pressure fluid. The high pressure fluid draws the low pressure fluid along the length of the jet pump 120 to the outlet 123. The fluids are well mixed into a homogenised mixture in the region 124 at the outlet of the high pressure inlet 121.

Figure 6:
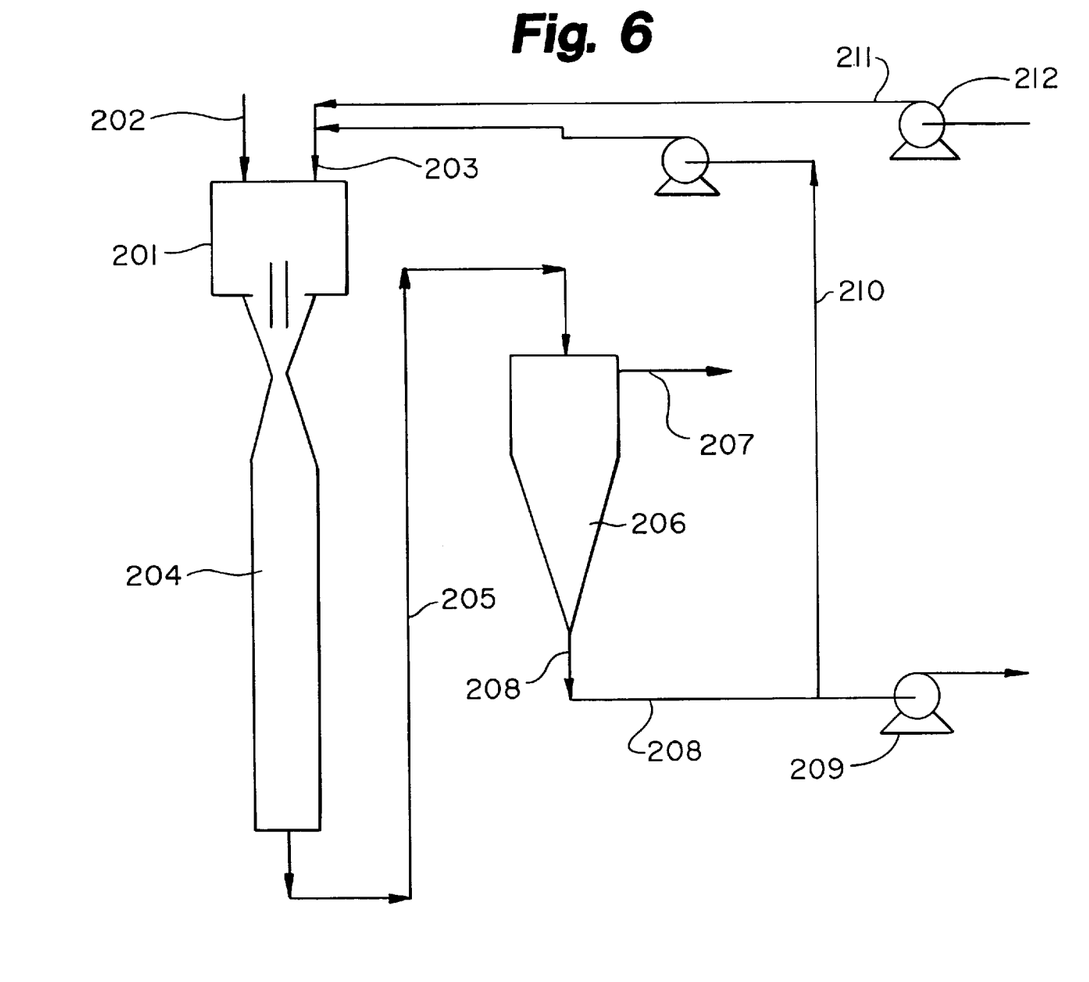
FIG. 6 is a block diagram of an alternative embodiment of a process according to the invention.

An alternative embodiment is shown in FIG. 6. Here the $CO_2$-containing gas is supplied to the contactor 201 via a gas inlet 202 and sea water is supplied via a solvent inlet 203. The two phases are mixed in the contactor 201 and subsequently in a contact pipe 204. The homogeneous mixture is fed via a line 205 to a separator 206 where separation into a cleaned gas stream 207 and a $CO_2$ loaded sea water stream 208 is effected.

The loaded sea water is conveyed to a discharge pump 209 which disposes of the $CO_2$ loaded sea water offshore. However, a portion of the $CO_2$-loaded sea water is recycled, via recycle line 210 directed to the contactor 201. This serves to increase the loading of the sea water in the system and thus enables the duty of the pump 209 to be reduced. Fresh sea water is supplied to the contactor 201 via a fresh sea water line 211 by means of a lift pump 212.

The invention is further illustrated by reference to the following examples. These serve to verify the operating principles of the invention.

In a series of experiments conducted, the ability of sea water to absorb $CO_2$ from a diesel engine exhaust was investigated. The contactor used was a FRAMO contactor generally as described in EP 379319 and shown in FIG. 1. The mixer injection pipe was adjusted to yield gas/liquid ratios in the range of about 4.5 to about 14, depending upon the total flow rate.

Figure 4:
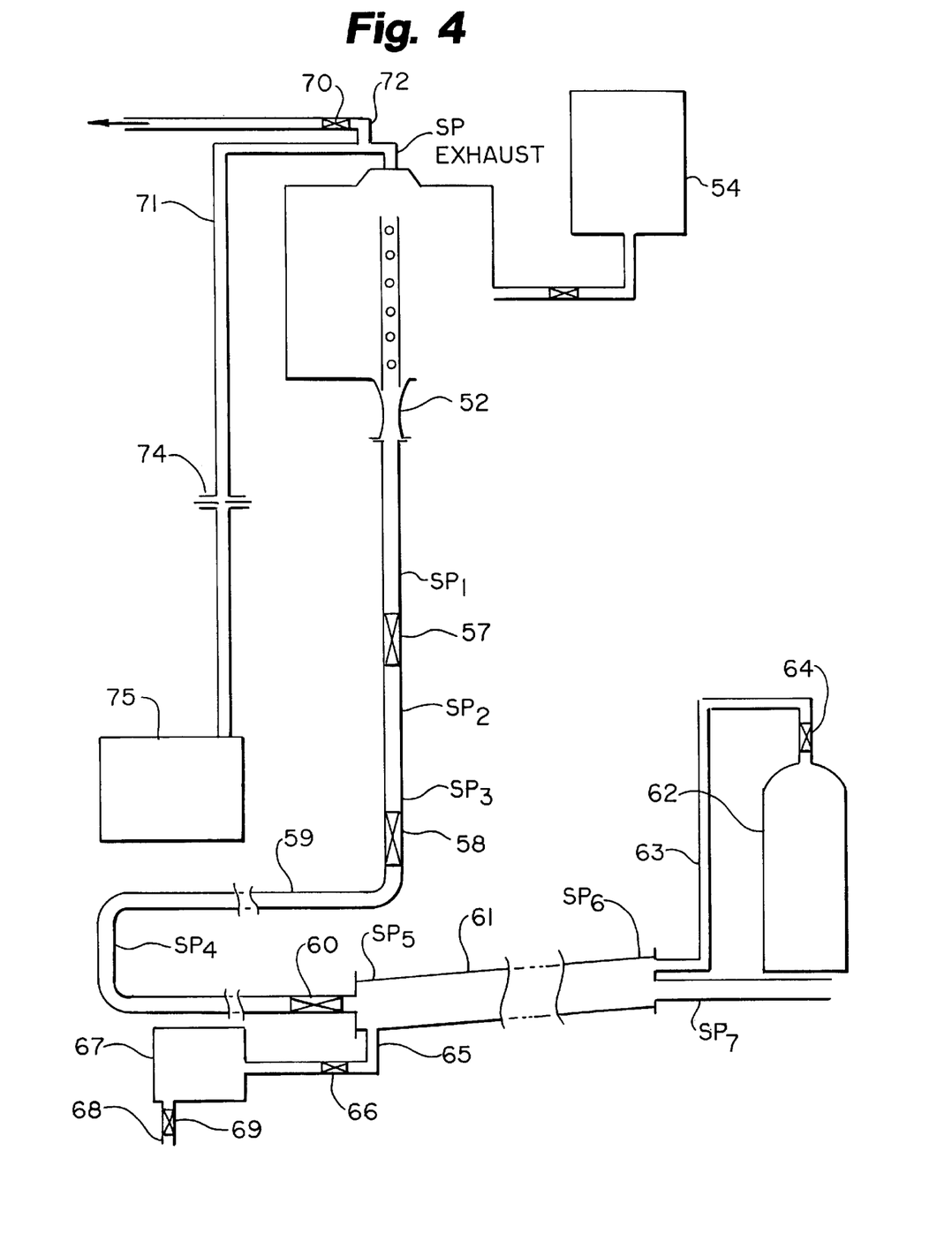
FIG. 4 is a block diagram of the apparatus used in a series of experiments.

A schematic diagram of the apparatus for the series of experiments is shown in FIG. 4.

The apparatus in FIG. 4 comprises a contactor 51, corresponding to that shown in FIG. 1, a vertical pipe section 56 leading from the venturi 52, and a horizontal pipe section 59 joining the vertical section 56 to a receiver 61 via valve 60. The vertical section 56 has two quick closing valves 57, 58. A sea water tank 54 leads to the contactor 51 via a valve 55. A diesel engine 75 has its exhaust connected to the contactor via a line 71 including an orifice plate 74. The line 71 is provided with a by-pass valve 70 in a by-pass line 72.

The receiver 61 is slightly inclined and has a liquid drain 65 at its lowest point, leading to a tank 67 via a valve 66. The tank 67 has an outlet 68 with a valve 69. The receiver 61 also has a gas cylinder 62 (not used) which can be used to pressurise the reservoir 61 via a line 63 with a valve 64.

Measurements are taken variously at eight sampling points designated SP in FIG. 4. Exhaust is located at the exhaust entry to the contactor 51. $SP_1$ is 1 meter after the contactor with SP2, and SP3, within the next 1.5 meters. SP4 is in the horizontal portion 59, SP5, is at the entry to the receiver 61 and $SP_6$ is at the opposite end of the receiver 61. The final $SP_7$ is in the receiver outlet.

Figure 5:
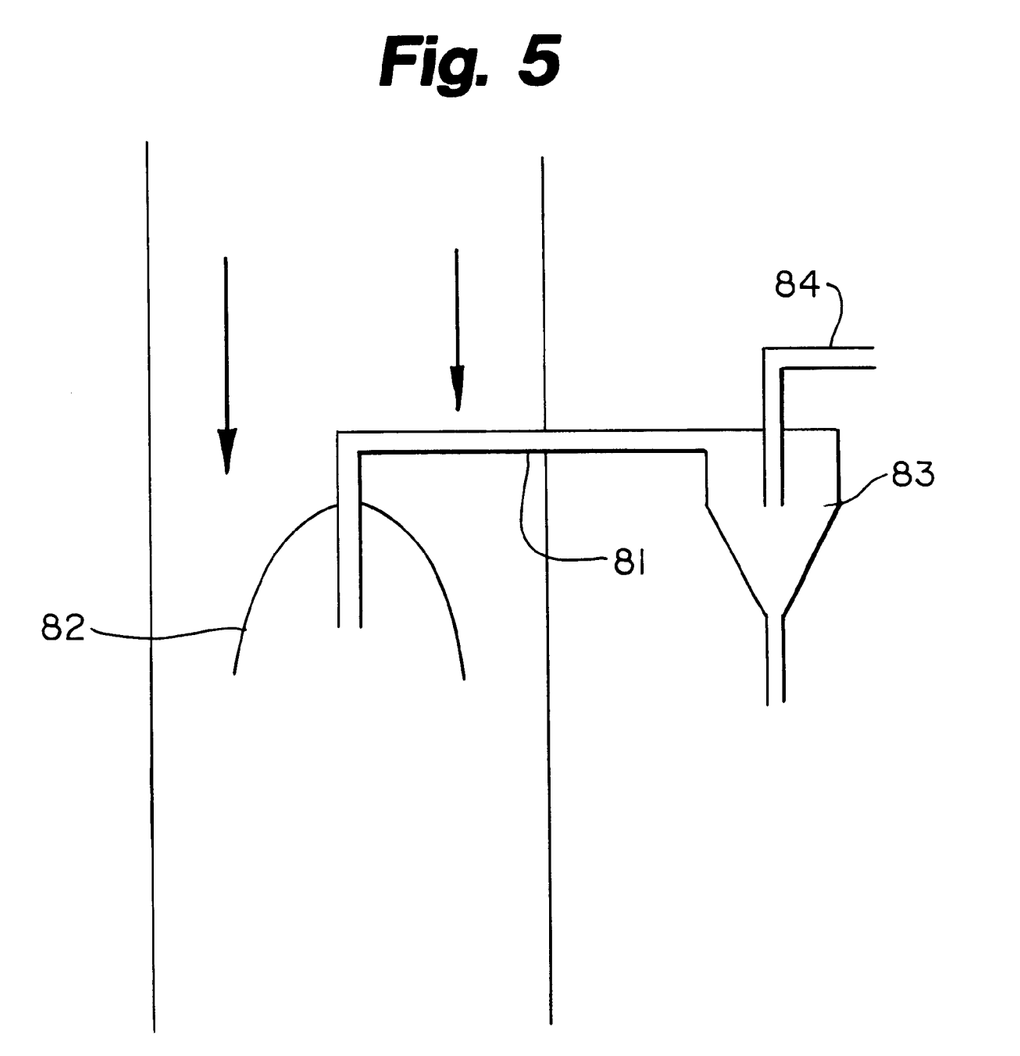
FIG. 5 is a schematic diagram of a sampling point.

Each sampling point, as shown in FIG. 5, comprises a centrally located sampling tube 81 opening in the downstream direction and protected by a cap 82. The cap serves to reduce liquid entrainment in the gas sample. The sampling tube leads to a hydrocyclone 83 which removes any residual moisture so that dry gas leaves the gas outlet 84 for analysis.

The contactor 51 and pipe section 56 were charged with sea water taken from a Norwegian fjord. Exhaust gas from a YANNMAR 4TN84E 15 KVA water-cooled diesel engine 75 was used as the feed gas. A 30% load was placed on the diesel engine to increase the exhaust gas temperature and also to obtain a higher level of $CO_2$ in the exhaust gas. The orifice plate 74 provided for continuous flow measurement of the exhaust gas.

The approach was based on sampling continuous flow in the pipe. The sampling probes were situated in the centre of the pipe with a cover, which accommodated the retrieval of a gas/liquid sample with low liquid content. This two-phase flow from each sampling was then routed through a gas/liquid cyclone from which a dry gas sample was taken from the gas outlet. [This arrangement with the sampling probe described was repeated in seven different locations downstream of the first contactor as well as in the exhaust feed entering the contactor.] The sampling locations are shown on FIG. 4 and referred to in Table 1.

The experiments were carried out either by pre-filling the first stage contactor with sea water and/or continuously supplying sea water from the fjord. In the former case, experiments have been carried out with different levels of sea water temperature.

An experiment would commence by initially charging exhaust gas into the first stage contactor to the steady state pressure level experienced for a long run. The quick opening/closing valves were then triggered to open and two-phase flow admitted through the system. After steady state conditions were achieved, gas samples were taken from the sampling points. The residence time as reported in Table 1 was calculated from the total flow rate of gas and liquid, local position in a given pipe section and the pipe length and diameter of the connected sections. The predicted $CO_2$ concentration as presented in Table 1 was calculated assuming an exponential decay of the $CO_2$ concentration in the gas versus the residence time in the contactor. Only experimental conditions with a certain statistical basis for calculating a time constant have been reported with predicated values. The analyses were carried out using a Chromopack Model CP 2002 chromatograph.

The results of the experiments are shown in Table 1.

With the exception of the upper temperature level tested (50° C.), it can be seen that considerable absorption is achieved. The experimental series 1801 to 1903, shows that a significant absorption was achieved through the contactor. However the $CO_2$ concentration continues to drop as the flow propagates along the contactor pipe line. Generally, it can be seen that the absorption efficiency is lower for the high gas liquid ratios (GLR).

For the experimental series 1004 to 1009, it can be seen that the exponential decay of the $CO_2$ concentration applies to the propagation of the multiphase flow in the contactor pipe line. However, the $CO_2$ absorption in the contactor is less pronounced as compared to 1801–1903.

TABLE 1

Experimental summary - absorption with sea water as solvent

| | | flowrates | | | Temp. | sampt. | resid. | $CO_2$-concentration | |
|---|---|---|---|---|---|---|---|---|---|
| Run. No | gas [m²/n] | liquid [m²/n] | mixture [m²/n] | GLR [–] | liq. deg C. | point no. | time [s] | measured [mol %] | predicted [mol%] |
| 1801 | 31 | 5.7 | 36.7 | 5.5 | 23 | exhaust | 0 | 53.1 | |
| 1801 | 31 | 5.7 | 36.7 | 5.5 | 23 | 1 | 0.105 | 34.9 | |
| 1801 | 31 | 5.7 | 36.7 | 5.5 | 23 | 2 | 0.19 | 37.3 | |
| 1801 | 31 | 5.7 | 36.7 | 5.5 | 23 | 3 | 0.256 | 33.3 | |
| 1801 | 31 | 5.7 | 36.7 | 5.5 | 23 | 4 | 0.455 | 30.3 | |
| 1801 | 31 | 5.7 | 36.7 | 5.5 | 23 | 5 | 0.581 | 23.5 | |
| 1802 | 32 | 5.3 | 37.3 | 6.0 | 19 | exhaust | 0 | 57.0 | |
| 1802 | 32 | 5.3 | 37.3 | 6.0 | 19 | 1 | 0.103 | 32.7 | |
| 1802 | 32 | 5.3 | 37.3 | 6.0 | 19 | 2 | 0.186 | 28.7 | |
| 1802 | 32 | 5.3 | 37.3 | 6.0 | 19 | 3 | 0.251 | 34.2 | |
| 1802 | 32 | 5.3 | 37.3 | 6.0 | 19 | 4 | 0.447 | 30.3 | |
| 1802 | 32 | 5.3 | 37.3 | 6.0 | 19 | 5 | 0.57 | 25.8 | |
| 1803 | 24 | 5.3 | 29.3 | 4.5 | 23 | exhaust | 0 | 2.7 | |
| 1803 | 24 | 5.3 | 29.3 | 4.5 | 23 | 1 | 0.13 | 1.6 | |
| 1803 | 24 | 5.3 | 29.3 | 4.5 | 23 | 2 | 0.236 | 1.5 | |
| 1803 | 24 | 5.3 | 29.3 | 4.5 | 23 | 3 | 0.317 | 1.2 | |
| 1803 | 24 | 5.3 | 29.3 | 4.5 | 23 | 4 | 0.564 | 1.2 | |
| 1804 | 24 | 5.0 | 29.0 | 4.8 | 23 | exhaust | 0 | 2.63 | |
| 1804 | 24 | 5.0 | 29.0 | 4.8 | 23 | 1 | 0.13 | 2.07 | |
| 1804 | 24 | 5.0 | 29.0 | 4.8 | 23 | 2 | 0.236 | 1.38 | |

TABLE 1-continued

Experimental summary - absorption with sea water as solvent

| Run. No | gas [m²/n] | liquid [m²/n] | mixture [m²/n] | GLR [-] | Temp. liq. deg C. | sampt. point no. | resid. time [s] | $CO_2$-concentration measured [mol %] | predicted [mol%] |
|---|---|---|---|---|---|---|---|---|---|
| 1804 | 24 | 5.0 | 29.0 | 4.8 | 23 | 3 | 0.317 | 1.29 | |
| 1804 | 24 | 5.0 | 29.0 | 4.8 | 23 | 4 | 0.584 | 0.99 | |
| 1804 | 24 | 5.0 | 29.0 | 4.8 | 23 | 5 | 0.72 | 1.19 | |
| 1805 | 24 | 4.1 | 28.1 | 5.9 | 20 | exhaust | 0 | 5.25 | |
| 1805 | 24 | 4.1 | 28.1 | 5.9 | 20 | 1 | 0.13 | 2.73 | |
| 1805 | 24 | 4.1 | 28.1 | 5.9 | 20 | 2 | 0.236 | 2.67 | |
| 1805 | 24 | 4.1 | 28.1 | 5.9 | 20 | 3 | 0.317 | 2.87 | |
| 1805 | 24 | 4.1 | 28.1 | 5.9 | 20 | 4 | 0.564 | 1.90 | |
| 1805 | 24 | 4.1 | 28.1 | 5.9 | 20 | 5 | 0.72 | 2.71 | |
| 1805 | 24 | 4.1 | 28.1 | 5.9 | 20 | 6 | 25 | 2.19 | |
| 1902 | 33.0 | 2.4 | 35.4 | 13.7 | 24 | exhaust | 0 | 4.52 | |
| 1902 | 33.0 | 2.4 | 35.4 | 13.7 | 24 | 1 | 0.106 | 2.95 | |
| 1902 | 33.0 | 2.4 | 35.4 | 13.7 | 24 | 2 | 0.132 | 3.03 | |
| 1902 | 33.0 | 2.4 | 35.4 | 13.7 | 24 | 3 | 0.258 | 3.47 | |
| 1902 | 33.0 | 2.4 | 35.4 | 13.7 | 24 | 4 | 0.46 | 2.95 | |
| 1902 | 33.0 | 2.4 | 35.4 | 13.7 | 24 | 5 | 0.587 | 3.10 | |
| 1902 | 33.0 | 2.4 | 35.4 | 13.7 | 24 | 6 | 17.4 | 3.74 | |
| 1903 | 33.0 | 2.4 | 35.4 | 13.8 | 24 | exhaust | 0 | 4.56 | |
| 1903 | 33.0 | 2.4 | 35.4 | 13.8 | 24 | 1 | 0.106 | 3.30 | |
| 1903 | 33.0 | 2.4 | 35.4 | 13.8 | 24 | 2 | 0.192 | 3.00 | |
| 1903 | 33.0 | 2.4 | 35.4 | 13.8 | 24 | 3 | 0.258 | 3.70 | |
| 1903 | 33.0 | 2.4 | 35.4 | 13.8 | 24 | 4 | 0.46 | 3.10 | |
| 1903 | 33.0 | 2.4 | 35.4 | 13.8 | 24 | 5 | 0.587 | 3.10 | |
| 1903 | 33.0 | 2.4 | 35.4 | 13.8 | 24 | 6 | 17.4 | 3.70 | |
| 1004 | 23.9 | 4.9 | 28.8 | 4.9 | 6 | exhaust | 0 | 4.21 | |
| 1004 | 23.9 | 4.9 | 28.8 | 4.9 | 6 | 1 | 0.134 | 3.85 | |
| 1004 | 23.9 | 4.9 | 28.8 | 4.9 | 6 | 3 | 0.325 | 3.44 | 3.50 |
| 1004 | 23.9 | 4.9 | 28.8 | 4.9 | 6 | 4 | 0.578 | 3.17 | 3.08 |
| 1004 | 23.9 | 4.9 | 28.8 | 4.9 | 6 | 7 | 20.7 | 3.32 | |
| 1005 | 23.9 | 4.9 | 28.8 | 4.9 | 6 | exhaust | 0 | 4.25 | |
| 1005 | 23.9 | 4.9 | 28.8 | 4.9 | 6 | exhaust | 0 | 4.25 | |
| 1005 | 23.9 | 4.9 | 28.8 | 4.9 | 6 | 1 | 0.134 | 3.77 | |
| 1005 | 23.9 | 4.9 | 28.8 | 4.9 | 6 | 3 | 0.325 | 3.34 | 3.42 |
| 1005 | 23.9 | 4.9 | 28.8 | 4.9 | 6 | 4 | 0.578 | 3.00 | 3.02 |
| 1006 | 23.9 | 4.9 | 28.8 | 4.9 | 27 | exhaust | 0 | 4.24 | |
| 1006 | 23.9 | 4.9 | 28.8 | 4.9 | 27 | exhaust | 0 | 4.25 | |
| 1006 | 23.9 | 4.9 | 28.8 | 4.9 | 27 | 1 | 0.134 | 3.80 | |
| 1006 | 23.9 | 4.9 | 28.8 | 4.9 | 27 | 3 | 0.325 | 3.72 | |
| 1006 | 23.9 | 4.9 | 28.8 | 4.9 | 27 | 4 | 0.578 | 3.46 | |
| 1006 | 23.9 | 4.9 | 28.8 | 4.9 | 27 | 6 | 19.99 | 3.53 | |
| 1007 | 23.9 | 4.9 | 28.8 | 4.9 | 6 | exhaust | 0 | 12.1 | |
| 1007 | 23.9 | 4.9 | 28.8 | 4.9 | 6 | exhaust | 0 | 12.0 | |
| 1007 | 23.9 | 4.9 | 28.8 | 4.9 | 6 | 1 | 0.134 | 10.9 | |
| 1007 | 23.9 | 4.9 | 28.8 | 4.9 | 6 | 3 | 0.325 | 8.8 | 8.9 |
| 1007 | 23.9 | 4.9 | 28.8 | 4.9 | 6 | 6 | 19.99 | 7.8 | |
| 1008 | 23.9 | 4.9 | 28.8 | 4.9 | 52 | exhaust | 0 | 4.28 | |
| 1008 | 23.9 | 4.9 | 28.8 | 4.9 | 52 | exhaust | 0 | 4.39 | |
| 1008 | 23.9 | 4.9 | 28.8 | 4.9 | 52 | 1 | 0.134 | 4.17 | |
| 1008 | 23.9 | 4.9 | 28.8 | 4.9 | 52 | 3 | 0.325 | 4.18 | |
| 1008 | 23.9 | 4.9 | 28.8 | 4.9 | 52 | 6 | 19.99 | 4.07 | |
| 1009 | 23.9 | 4.9 | 28.8 | 4.9 | 52 | exhaust | 0 | 4.36 | |
| 1009 | 23.9 | 4.9 | 28.8 | 4.9 | 52 | exhaust | 0 | 4.27 | |
| 1009 | 23.9 | 4.9 | 28.8 | 4.9 | 52 | 3 | 0.325 | 4.10 | |
| 1009 | 23.9 | 4.9 | 28.8 | 4.9 | 52 | 4 | 0.578 | 3.87 | |
| 1009 | 23.9 | 4.9 | 28.8 | 4.9 | 52 | 6 | 19.99 | 3.78 | |

What is claimed is:

1. A method of removing acid gas components from a gas mixture which comprises: bringing the gas mixture into contact with sea water; subjecting the gas mixture and sea water to turbulent mixing conditions thereby causing the acid gas to be absorbed by the sea water; and separating gas phase and a liquid phase, in which the acid gases absorbed include $H_2S$ and $NO_x$ and further in which, after absorption, the sea water is treated with a reagent to react with the $H_2S$, the $NO_x$, or both the $H_2S$ and the $NO_x$.

2. A method as claimed in claim 1 in which the gas mixture is a combustion gas or natural gas.

3. A method as claimed in claim 1 in which the acid gases absorbed include carbon dioxide.

4. A method as claimed in claim 1 in which the method is carried out as a continuous process with the gas mixture and the sea water flowing co-currently.

5. A method as claimed in claim 1 in which the mixing is achieved in an ejector or a jet pump.

6. A method of removing acid gas components from a gas mixture which comprises: bringing the gas mixture into contact with sea water; subjecting the gas mixture and sea water to turbulent mixing conditions thereby causing the acid gas to be absorbed by the sea water; and separating gas phase and a liquid phase in which the mixing is carried out in a turbulent contactor including a gas inlet, a liquid inlet, an outlet leading to a venturi passage and a tube extending from the outlet back upstream, the tube being perforated and/or being spaced from the periphery of the outlet.

7. A method as claimed in claim 6 in which the tube is located in a vessel, the vessel including the gas inlet, the liquid inlet and the outlet.

8. A method as claimed in claim 7 in which the gas mixture is supplied to the tube and the sea water is supplied to the vessel, whereby the gas stream draws the sea water into the venturi and the two phases are mixed.

9. A method as claimed in claim 7 in which the gas mixture is supplied to the vessel and the sea water is supplied to the tube, whereby the gas mixture is drawn into the venturi by the sea water and the two phases are mixed.

10. A method as claimed in claim 7 in which the sea water and the gas mixture are supplied to the vessel, the sea water being supplied to a level above the level of the outlet, whereby the gas mixture is forced out through the outlet via a tube, thereby drawing the sea water into the venturi so that the two phases are mixed.

11. A method as claimed in claim 1 in which the gas mixture and the sea water are formed into a homogeneous mixture in a contactor and the homogeneous mixture is cooled prior to separation into a gas phase and a liquid phase.

12. A method as claimed in claim 2 in which the acid gases absorbed include carbon dioxide.

* * * * *